June 30, 1953     G. S. SHAAK     2,643,635
MACHINE FOR INKING THE EDGES OF SHOE SOLES AND HEELS
Filed May 23, 1952     4 Sheets-Sheet 1

INVENTOR.
George S. Shaak.
BY
ATTORNEY.

June 30, 1953  G. S. SHAAK  2,643,635
MACHINE FOR INKING THE EDGES OF SHOE SOLES AND HEELS
Filed May 23, 1952  4 Sheets-Sheet 2
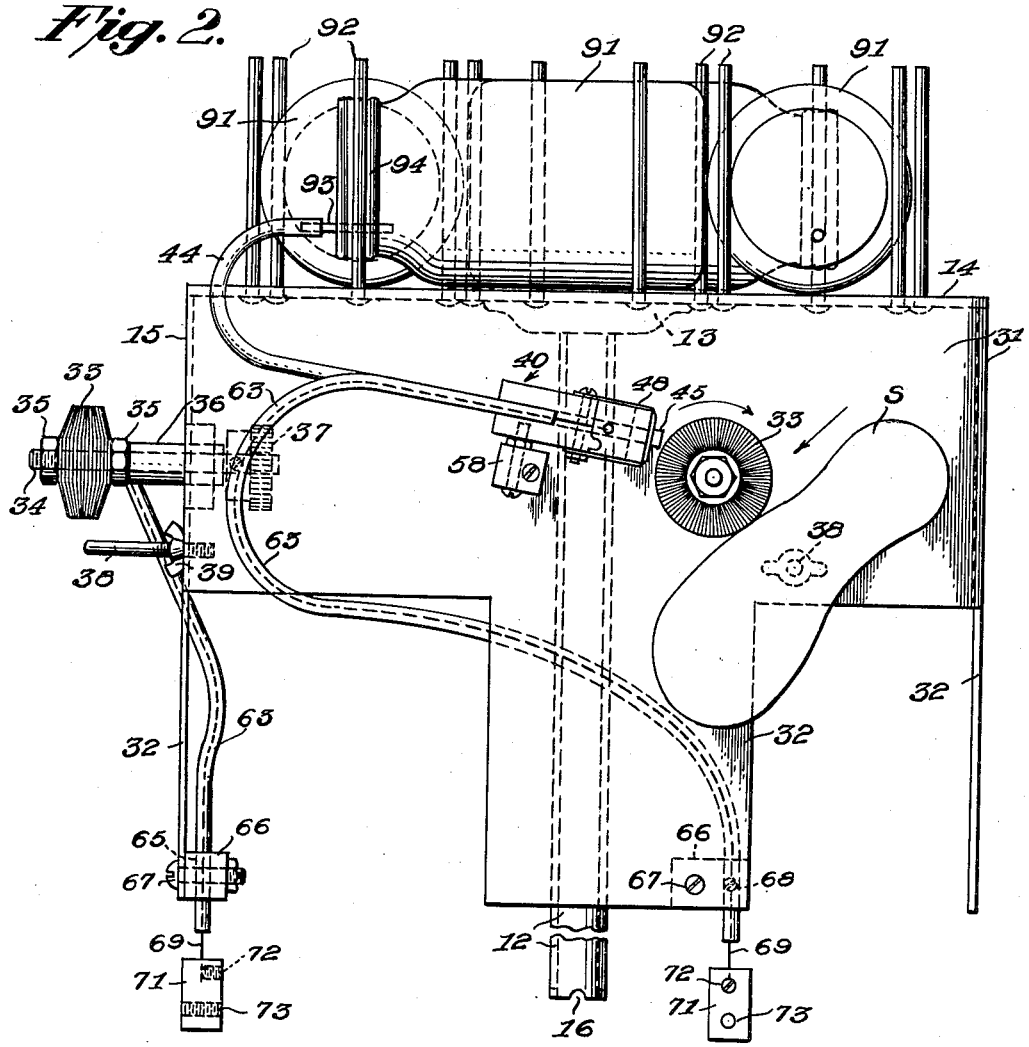
Fig. 2.
Fig. 3.
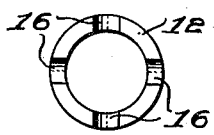
INVENTOR.
George S. Shaak
BY
ATTORNEY June 30, 1953  G. S. SHAAK  2,643,635
MACHINE FOR INKING THE EDGES OF SHOE SOLES AND HEELS
Filed May 23, 1952  4 Sheets-Sheet 3
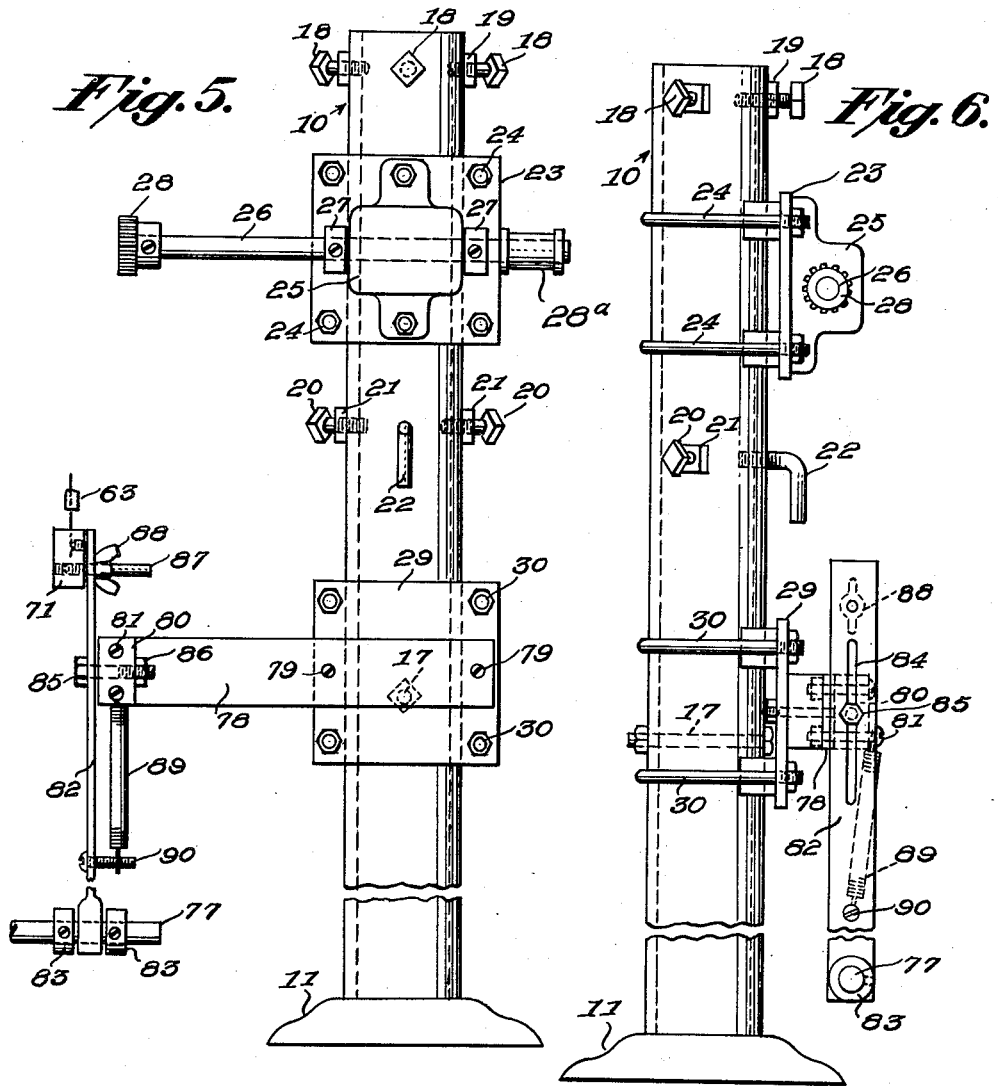
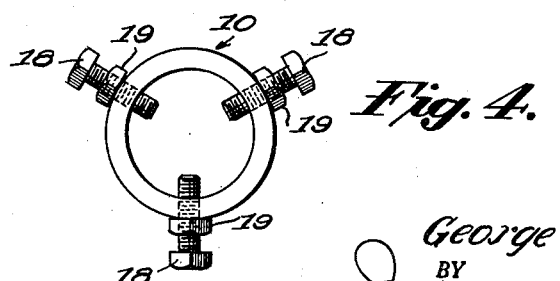
INVENTOR.
George S. Shaak
BY
ATTORNEY June 30, 1953  G. S. SHAAK  2,643,635
MACHINE FOR INKING THE EDGES OF SHOE SOLES AND HEELS
Filed May 23, 1952  4 Sheets-Sheet 4
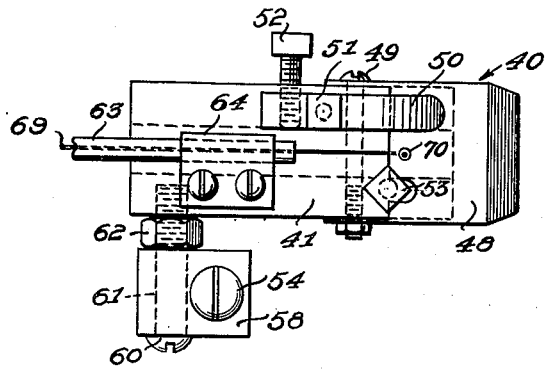
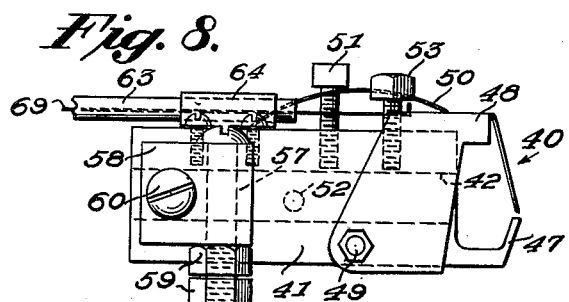
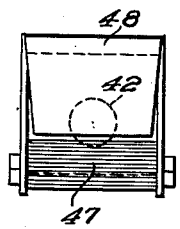
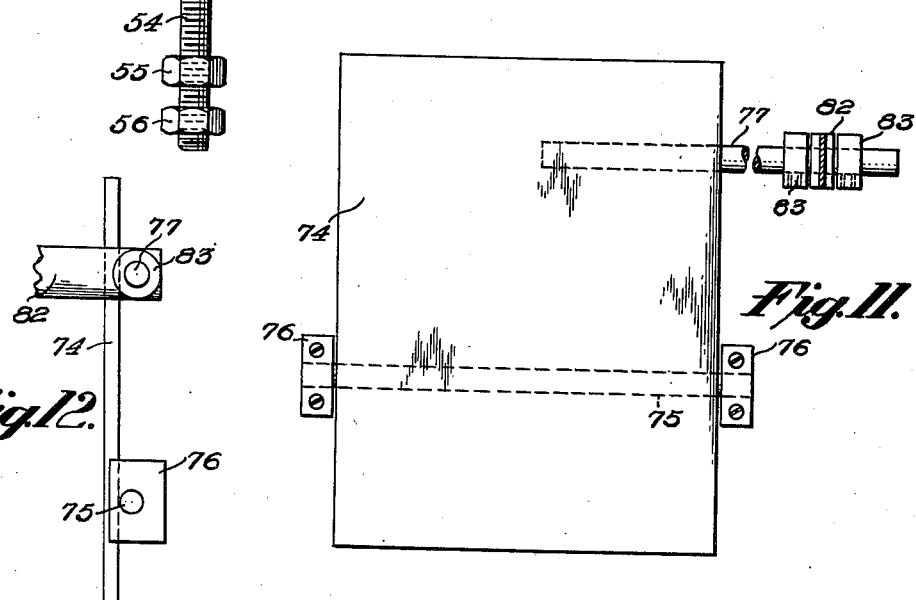
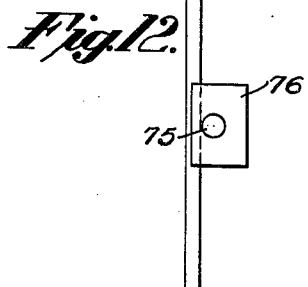
INVENTOR.
George S. Shaak
BY
ATTORNEY.

Patented June 30, 1953

2,643,635

UNITED STATES PATENT OFFICE 2,643,635

MACHINE FOR INKING THE EDGES OF SHOE SOLES AND HEELS

George S. Shaak, Lebanon, Pa.

Application May 23, 1952, Serial No. 289,598

10 Claims. (Cl. 118—255)

This invention relates to a machine for inking the edges of shoe soles and heels.

The invention is more particularly concerned with a machine for staining, treating or applying a uniform coat of ink of any desired thickness to the edge surface of the sole and heel of a shoe.

A primary object of the invention is to provide a machine which is capable of applying ink to the soles and heels of shoes without soiling or defacing the white stitching on both the welt and the tread, and with greater dispatch and facility than is provided by the customary hand operation.

A further object of the invention is to provide a machine of the character referred to which in its operation effects a more consistently delicate touch over the entire edge surfaces of a shoe sole and heel than has been possible in the customary inking operation.

A still further object of the invention is to provide a machine which is adapted to efficiently ink the edges of soles and heels of shoes of different sizes as well as those having soles of different curvatures.

A still further object of the invention is to provide a machine for inking the edge surfaces of shoe soles and heels which is relatively simple in construction, highly efficient in operation and which is capable of manufacture and servicing at relatively low cost.

Other objects and advantages of the invention will become apparent in the course of the following detailed description taken in connection with the accompanying drawings, wherein Figure 1 is a top plan view of the rotatable ink supply supporting table showing only one of the four inking assemblies complete, the other three being shown fragmentally only.

Fig. 2 is a front elevational view showing a complete inking assembly in face view which may be at the operator's position relative to the machine, this view also showing another of the four inking assemblies in edge elevation.

Fig. 3 is an enlarged plan view of the lower end of the table-supporting tube.

Fig. 4 is a top plan view of the tubular supporting pedestal.

Fig. 5 is a broken front elevational view of the supporting pedestal.

Fig. 6 is a broken side elevational view of the pedestal as observed from the left of Fig. 5.

Fig. 7 is a side elevational view of the ink control assembly.

Fig. 8 is a bottom plan view of the ink control assembly.

Fig. 9 is a right-hand end elevational view of the ink control assembly with parts omitted for clarity of disclosure.

Fig. 11 is a top plan view of the treadle.

Fig. 12 is a right-hand elevational view of the treadle.

Figures 1, 10:
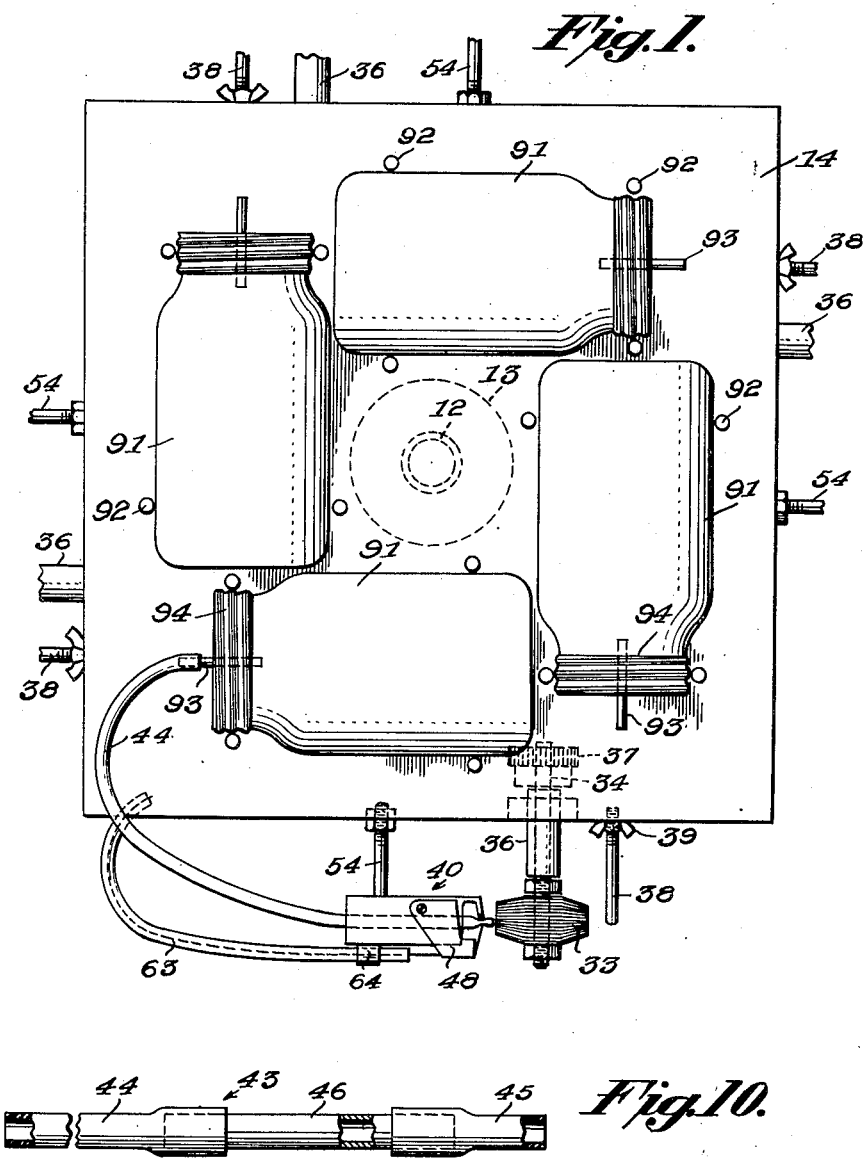
Fig. 10 is a view partially in plan and partially in section of a compound tubular member included in the ink control assembly.

Referring now in detail to the drawings, 10 designates a tubular supporting pedestal which is provided with a supporting base 11. The tubular pedestal 10 rotatably supports a tube 12 whose upper end is provided with a flange 13 rigidly connected to the under face of the top 14 of a table 15 centrally thereof, and the lower end of the tube is provided with four generally semi-circular notches 16 disposed 90° apart about the circumference of the tube.

The pedestal 10 is provided with a bolt 17 which supports the lower end of the tube 12 and which normally seats in two diametrically opposed notches 16 to retain the tube 12 and table 15 against rotation while permitting the table upon an initial elevation thereof to be rotated through an angle of 90° or multiples thereof in order to bring any desired inking assembly into position at the operator's station.

The pedestal 10 is further provided with three bolts 18 adjacent its upper end in 120° circumferentially spaced relation. These bolts are screw-threaded through the wall of the pedestal and are adapted to be so axially adjusted that their inner ends engage and center the upper portion of the tube 12, and the bolts 18 are provided with lock nuts 19 adapted to retain the bolts in their adjusted positions.

The pedestal is also provided with three bolts disposed intermediate the through bolt 17 and the bolts 18, two of which are similar to bolts 18 and are designated 20, and each of which is provided with a lock nut 21. The third bolt is designated 22 and which is of angular formation including a handle. The three bolts 20, 22 similarly to the bolts 18 are adapted to be adjusted to engage and center the tube 12 within the tubular pedestal 10. The angular bolt 22 further functions to lock the tube 12 against rotation within the pedestal 10.

The pedestal 10 is further provided with a bracket 23 intermediate the two sets of tube-centering bolts above described. The bracket is in the form of a rectangular plate and is rigidly but adjustably secured to the pedestal by means of a pair of U-bolts 24. The bracket 23 supports a bearing 25 in which is rotatably supported the intermediate portion of a shaft 26 which is provided with a pair of adjustable collars 27 engageable with opposite sides of the bearing 25 for retaining the shaft 26 against axial movement. The shaft 26 is provided on the longer projecting end with a spur gear 28 adapted to be driven by suitable power means, and the shorter projecting end of the shaft is provided with a pulley 28ª for engagement with a power driven belt.

The pedestal 10 is also provided with a second bracket 29 substantially below the bracket 23 and which is adjustably retained in fixed position by means of a pair of U-bolts 30.

The table 15 includes four side walls 31 depending from its generally square top 14, and depending from each side wall 31 is an apron 32, and each side wall with its associated apron carries an inking assembly later referred to, one of which is completely shown in Fig. 2.

Each side wall 31 is provided with an ink-applying rotary brush 33 which is secured to the outer end of a rotary shaft 34 by means of a pair of nuts 35. The shaft 34 is rotatably journalled in a bearing 36, and a spur gear 37 is secured to the inner end of the shaft.

The four spur gears 37 carried by the side walls 31 of the table are equally spaced from the axis of tube 12 and at a distance equal to the spacing of the spur gear 28 from the axis of the pedestal 10, and the relative dispositions of the bolt 17 and the notches 16 are such that in each of the four locked positions of the table, the spur gears 28 and 37 will be in meshed driving connection.

Each table side wall 31 is further provided with a tread rest bolt 38 which projects outwardly from the side wall and is adjustably retained in position by means of a thumb nut 39. The tread rest bolt is disposed adjacent the brush 33 and is adapted to support the tread of a shoe S which is manually manipulated by an operator.

An ink-control assembly 40 is supported on each table side wall 31 adjacent the corresponding ink-applying brush 33. Each such ink-control assembly (Figs. 7, 8 and 9) comprises an elongated housing 41 which is provided with a longitudinal bore 42 in which is disposed the tubing assembly 43 illustrated in Fig. 10, and which comprises two variable lengths of rubber tubing 44 and 45 joined by an intermediate metallic tube 46. The free end of rubber tubing 45 is impinged between a fixed jaw 47 on the housing 41 and a movable jaw 48 which is pivotally supported by a bolt 49 extending through the housing 41 below the bore 42.

A leaf spring 50 has one end thereof secured to the housing 41 and the free end thereof yieldably bears on the movable jaw 48, and a screw 51 extends through the leaf spring 50 and is threaded into the housing 41. The leaf spring 50 through proper adjustment of screw 51 exerts sufficient pressure upon the movable jaw 48 to interrupt or completely choke off the flow of ink through the impinged rubber tubing 45.

The intermediate metallic tube 46 is retained in fixed position within the bore 42 by means of a screw 52 which extends through the wall of housing 41 and bears upon the tube. Since the constant flattening of tubing 45 through pressure of the jaws 47 and 48 thereon would impair the restoring properties thereof, the screw 52 serves for the rotation of the tubing at intervals, thereby avoiding fatigue in the ink-dispensing rubber tubing 45.

An ink-regulating screw 53 is adjustably supported in the housing 41 and has a head overlying the movable jaw 48 for controlling the extent of opening movement thereof and accordingly the amount of ink fed to the brush 33.

The housing 41 is supported on the side wall 31 by means of a bolt 54 whose free threaded end extends through an aperture in the wall and a pair of cooperating nuts 55, 56 on the bolt engage the outer and inner faces of the wall for retaining the bolt in rigid position.

The bolt 54 adjacent its head end extends through an aperture 57 in a two-way pivoting block 58, and a pair of lock nuts 59 on the bolt 54 engage a side wall of the block 58 and provide for frictional rotational movement of the block on the bolt. This construction provides for raising or lowering the tubing 45 relative to the brush 33.

The pivoting block 58 is connected to the housing 41 by means of a bolt 60 disposed at right angles to bolt 54 and whose shank extends through an aperture 61 in the block 58 and is threaded into the housing 41, a lock nut 62 on the bolt being engageable with the housing for locking the bolt in rigid position. This construction provides for frictionally pivoting the housing laterally of the side wall for proper distribution of the flow of ink onto the periphery of the brush 33.

A flexible metallic tube 63 has one end thereof secured to the housing 41 by means of a clamp 64. The flexible tube extends downwardly along a table side wall 31 and the adjacent apron 32 and has its opposite or lower end extended through an aperture 65 in a retainer block 66 which is secured on the inner wall of the apron adjacent a lower corner thereof by means of a bolt 67 and the tube is secured in the aperture by means of a set screw 68.

A Bowden wire 69 extends within the tube 63 throughout its length and has one end thereof secured to the movable jaw 48 at 70. The opposite or lower end of the Bowden wire is secured to an anchor block 71 by means of a set screw 72 and the anchor block is provided with a tapped aperture 73 for a purpose later referred to.

A treadle 74 is disposed at the operator's station or slightly to the left of the forwardly facing apron 32 in Fig. 2, and which treadle is pivotally supported intermediate its ends by means of a shaft 75 which is secured to the lower wall of the treadle and whose opposite ends are pivotally journalled in bearings 76 suitably secured to a floor.

The treadle 74 is provided with a depressor rod 77 which is parallel with shaft 75 and which projects laterally of one edge of the treadle adjacent the operating end thereof as is clearly shown in Fig. 11.

The purpose of the depressor rod 77 is to impart downward movement to an anchor block 71 which is positioned directly thereabove when the table 15 is rotated to an operative position at the operator's station whereby upon pressing down on the treadle 74 the Bowden wire 69 moves the movable jaw 48 away from the fixed jaw 47 in opposition to the action of spring 50.

Means are provided for readily removably connecting the depressor rod 77 with the anchor block and such means are as follows:

The bracket 29 on the pedestal 10 is provided with a laterally extending mounting bar 78 whose one end is rigidly secured to the bracket by screws 79 and whose opposite end has a block 80 secured thereto by screws 81.

A connector bar 82 has its lower end pivotally connected to the depressor rod 77 between a pair of collars 83. The connector bar 82 is provided with an elongated slot 84 intermediate its ends and through which extends a bolt 85 and which also extends through the block 80 and is locked therein by means of a nut 86.

The upper end of the connector bar 82 is provided with a bolt 87 adapted to be threaded into the tapped aperture 73 in the anchor block 71, and a wing nut 88 is applied to bolt 87 for locking same in position.

In order to neutralize the weight of the treadle and connector bar, a tension spring 89 has one end thereof secured by one of the bolts 81 and the opposite end thereof is secured to the shank of a bolt 90 which extends through and projects laterally of the connector bar 82.

The rotatable table 15 removably supports four ink reservoirs 91 (which preferably are in the form of standard glass "Mason" jars). Each reservoir is retained in position by four upright pins 92 secured to the top 14 of the table and from which the reservoir may readily be removed.

An advantage of the glass reservoirs is that they provide a visual indication of the supply of ink therein and when refilling is required.

The four reservoirs accommodate the four commonly used stains or inks, namely, brown, white, black, and natural. A rigid metal tube 93 extends through and is secured to each of the screw cap covers 94 and to which corresponding ends of the rubber tubes 44 are secured.

An inking operation is carried out by the above disclosed machine as follows: An operator is stationed at a position corresponding to the front side of Fig. 5 wherein the treadle 74 is located within easy reach at his left, and which treadle as well as the pedestal 10 remain fixed at all times. The operator will then loosen bolt 22 and rotate the table 15 through an angle of 90° or a multiple thereof, depending upon the color of ink he desires to use.

When the table is brought into operative position as governed by notches 16 and bolt 17, gear 37 will mesh with the power driven gear 28. The treadle 74 will then be connected with the Bowden wire anchor block 71 by means of the connector bar 82, as above described. The operator takes a position facing the rotating brush 33 slightly to the rear and left of it so that his line of vision is directed to the point of contact of a shoe S with the rotating brush 33 as well as to the point where the rubber tubing nozzle tube delivers ink to the periphery of the rotating brush, both features being advantageous in performing an inking operation.

The operator then grasps a last-supported shoe with his right hand, while a last pin approximately six inches in length is held by his left hand and thrust into the thimble of the last. As his right hand directs the edge face of the sole and heel into contact with the periphery of the rotating brush, his left hand directs the rotation of the shoe over the periphery of the rotating brush and completes the inking of a shoe in one revolution thereof. The tread rest bolt 38 provides a rest as well as a guide for the shoe while it is being directed and passed over the rotating brush.

Both right and left shoes are inked in the same manner regardless of the sizes of the shoes or the curvatures of the soles thereof.

In the inking operation, the ink of the particular color being used is fed by gravity from the corresponding jar 91 through the rubber tube 44, metallic tube 46 and the nozzle tube 45 which is normally closed by jaws 47 and 48 as above described, and the flow of ink is regulated by the operator through the treadle 74 and the Bowden wire 69.

While I have disclosed my invention in accordance with a single structural embodiment thereof, such is to be considered as illustrative only and not restrictive, the scope of the invention being defined in the following claims.

What I claim and desire to secure by U. S. Letters Patent is:

1. A machine for inking the edges of shoe soles and heels and comprising a vertically disposed pedestal supporting a control treadle at an operator's station, power-operated drive means supported by the pedestal, a horizontal rectangular table rotatably supported on a vertical axis by said pedestal, an ink assembly supported by each side of the table cooperating with a respective reservoir and including a rotatable ink-applying brush, and drive means for each brush adapted to operatively engage said power-operated drive means upon rotation of said table to bring any one of said inking assemblies into position at said operator's station.

2. The structure according to claim 1, wherein said pedestal is tubular in form, said table being provided with a cylindrical member depending therefrom centrally thereof, and cooperating means on the pedestal and member for governing the rotation of the table to bring a selected inking assembly into accurate position at said operator's station.

3. The structure according to claim 1, wherein said treadle is provided with means selectively engageable with and disengageable from the inking assemblies as they are successively brought into position at said operator's station and removed therefrom.

4. The structure according to claim 1, wherein each of said inking assemblies includes a flexible nozzle for applying ink onto the periphery of said brush, a conduit intercommunicating said nozzle with an associated ink reservoir, means for normally closing said nozzle, and means operatively engageable with said treadle for opening the nozzle.

5. The structure according to claim 1, wherein each of said inking assemblies includes a housing supported on a side wall of said table, a flexible ink-applying nozzle supported by the housing in juxtaposition to the periphery of said brush, a conduit connecting said nozzle to a corresponding ink reservoir, fixed and movable jaws supported by said housing receiving the nozzle therebetween and normally closing same, flexible means connected to the movable jaw for retracting same from the fixed jaw for opening of the nozzle, and means for releasably connecting said flexible means to said treadle.

6. The structure according to claim 5, wherein said housing is supported by the table on a pivot parallel to the axis of said brush and a pivot at right angles thereto for selective positioning of said nozzle relative to the periphery of said brush.

7. The structure according to claim 1, wherein said ink reservoirs are supported on the horizontal top of said table and said inking assemblies are supported on vertical side walls of the table.

8. A machine for inking the edges of shoe soles and heels comprising a vertical tubular pedestal, a rectangular table including a horizontal top and depending vertical side walls, a tube depending from said table top centrally thereof and telescoped within said pedestal for rotation of said table about a vertical axis, an ink reservoir supported by said table top adjacent each side wall, an inking assembly supported by each side wall and including a flexible ink-delivering nozzle, a conduit intercommunicating each nozzle with a respective ink reservoir, a shaft journalled in each side wall normal thereto and having a gear on its inner end, a rotatable brush on the outer end of said shaft juxtaposed to said nozzle, a treadle at an operator's station, means normally maintaining each nozzle closed, a flexible member having one end thereof connected to said means for opening the nozzle, the treadle being provided with means for connection with the flexible means at said operator's station, and a power driven gear supported by said pedestal and engageable with a table-carried gear upon rotation of the table to successively position said inking assemblies at said operator's station.

9. The structure according to claim 8, together with means for centering said tube within said pedestal.

10. The structure according to claim 8, together with means on said pedestal and cooperating with said tube for locking said table in a rotated operative position at said station.

GEORGE S. SHAAK.

References Cited in the file of this patent

UNITED STATES PATENTS

| Number | Name | Date |
|---|---|---|
| 629,132 | Kenison | July 18, 1899 |
| 629,316 | Evans et al. | July 18, 1899 |
| 1,118,542 | Erickson | Nov. 24, 1914 |
| 1,838,112 | Rundell | Dec. 29, 1931 |